T. HUNT.
DUST COLLECTOR.
APPLICATION FILED AUG. 6, 1909.
993,448.
Patented May 30, 1911.
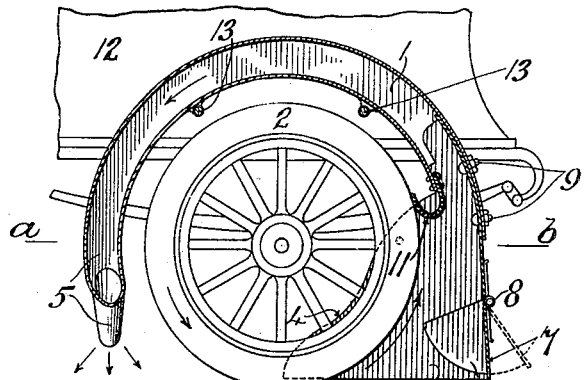
Fig 1.
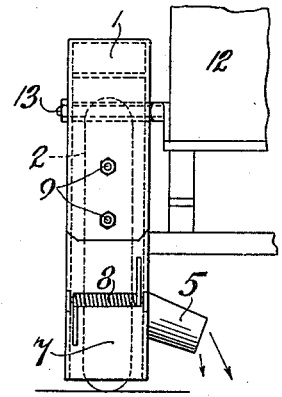
Fig 2.
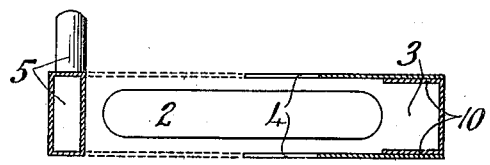
Fig 3.
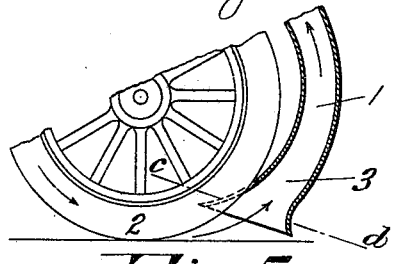
Fig 5.
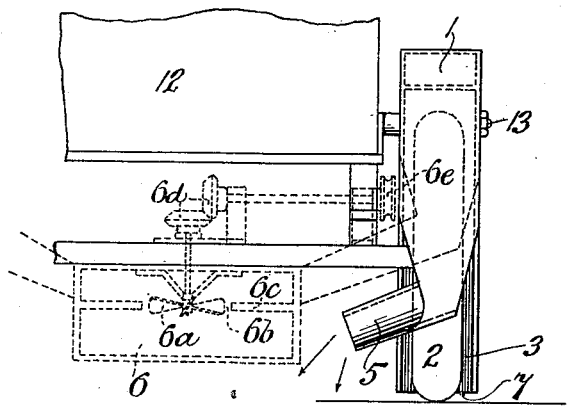
Fig 4.
Fig 6.
Witnesses:—
A. F. Heuman.
Thomas S. Nelson
Inventor:—
Thomas Hunt.
By
Wm Wallace White
Atty

UNITED STATES PATENT OFFICE.

THOMAS HUNT, OF ATHERSTONE, ENGLAND.

DUST-COLLECTOR.

993,448.

Specification of Letters Patent. Patented May 30, 1911.

Application filed August 6, 1909. Serial No. 511,567.

*To all whom it may concern:*

Be it known that I, THOMAS HUNT, a subject of the King of Great Britain, residing at Atherstone, in the county of Warwick, England, have invented new and useful Improvements in Dust-Collectors, of which the following is a specification.

This invention relates to devices for use in connection with motor vehicles for the prevention or collection of dust.

The present invention comprehends an improved device or apparatus adapted to collect and lay, or collect and contain the dust raised by the wheels of a motor vehicle.

The invention is carried into effect by the provision of what may be termed a collecting guard which partly surrounds each wheel and is adapted to collect the dust therein as it is thrown up or raised by the revolving wheel. One end of the collecting guard is located behind or at the rear of the wheel and is of a bell mouth or funnel shape so that it may partly surround the tire of the wheel. The collecting guard is continued from the open or bell mouth end in the form of a tube and at its opposite end either descends to discharge the collected dust onto the road, or leads to a collecting box wherein the collected dust is received. The dust may be drawn up the collecting guard by the natural centrifugal draft engendered by the rotation of the wheel or a small driven fan may be employed to create an air current to suck up the dust into or through the collecting guard.

In order that the invention may be clearly and readily understood reference will be made in the following further description to the accompanying drawing, wherein:—

Figure 1 is a sectional elevation of a dust collecting guard constructed according to this invention and is shown applied to one wheel of a motor vehicle. Fig. 2 is a rear view of the guard. Fig. 3 is a sectional plan of the guard taken on the line *a—b* of Fig. 1. Fig. 4 is a front view of the dust collecting device. Fig. 5 is a sectional view showing an alternative formation of the bell mouth or open end of the collecting guard. Fig. 6 is a sectional plan taken on the line *c—d* of Fig. 5.

According to this invention there is arranged in combination with each wheel of a motor vehicle a collecting guard 1 which, as illustrated in Fig. 1, partly surrounds the wheel 2, *i. e.* the guard 1 is located around the periphery of the upper part of the wheel. One end of the said collecting guard viz., that end located behind or at the rear of the wheel is formed with a bell mouth, funnel or enlarged opening 3 located in close proximity to the ground and so disposed in relation thereto as to catch the dust when the latter is thrown up by the revolving wheel 2. In the preferred construction of the bell mouth end 3, side wings or cheeks 4 are arranged to extend over the rear sides of the wheel so as to catch the dust in all directions as it is displaced or thrown up by the revolving wheel. The collecting guard 1 is continued from the upper end of the bell mouth 3 in the form of a tube or pipe which is located over the upper part of the wheel and at the opposite end 5 is either carried downward in the manner shown by full lines in Figs. 1 and 4 to discharge the dust onto the road, or is connected to a box or receptacle 6, as shown by dotted lines in Fig. 4, in which the collected dust may be contained. The bell mouth or enlarged open end 3 of the collecting guard is furnished with a small door 7 located at the back of the guard and in close proximity to the ground. The door is normally held closed by a spring 8 and is adapted to open, as indicated by dotted lines in Fig. 1, under the weight or force of a stone or similar body to discharge or pass over the same in the event of such body being thrown up into the guard by the wheel or being an obstruction in the path of the guard.

In the alternative construction of the bell mouth or enlarged open end of the collecting guard shown in Figs. 5 and 6, the said end 3 is made of a C cross section so that it may partly surround the tire of the wheel as shown in Fig. 6.

In the construction illustrated in Figs. 1 and 2, the bell mouth portion 3 is preferably made detachable from the tubular portion 1 of the guard, the said two parts being held together by means of bolts or screws 9.

As shown in Fig. 1, the door 7 is furnished with sides or wings 10 thereon which prevent side openings occurring when the door is open. A dependent flap or tongue 11 of leather or other suitable material is attached to the interior upper end of the bell mouth 3 and lies on the surface of the tire between the upper ends of the wings or cheeks 4 thus filling up the opening between the tire and entrance to the tubular portion of the collecting guard.

The dust may be drawn up into the bell mouth 3 and around the collecting guard 1 by the natural centrifugal draft, engendered by the rotation of the wheel 2 and indicated by arrows in Fig. 1. Or, if desirable, a small driven fan 6ª, preferably located in an opening 6ᵇ in a partition or baffle 6ᶜ of the dust box 6, may be employed in connection with the collecting guard 1 to suck up or create an air current to more positively draw the dust up the bell mouth and guard. A convenient method of driving the fan 6ª is by means of friction cones or gear wheels 6ᵈ actuated by a pulley 6ᵉ driven by a belt from the wheel axle or a driving pulley on the inside of the wheel.

The collecting guards 1 of each wheel of a vehicle may be connected to a common dust containing box and one fan may, if desirable, be employed for all the collectors.

The collecting guards of the rear wheels may be carried on the frame or body 12 of the vehicle, for example by bolts 13, but the guards of the steering wheels would be attached to or carried on the axle or similar part so as to move with and follow the path of said wheels. The delivery ends 5 of the front or steering wheel collecting guards may be connected by flexible tubing to the dust box 6 when one is provided.

What I claim then is:—

1. A dust collector for motor vehicles, consisting of a tubular collecting guard adapted to partly surround the wheel and having at one end thereof a bell mouth consisting of a rear wall and side cheeks, the latter being arranged to extend over the rear sides of the wheel, a hinged door in the lower end of the rear wall, a spring to normally keep said door closed, and a dependent flap of pliable material having one end secured to said tubular guard adjacent the upper end of said bell mouth, said flap being folded back upon itself and having its free end engaging the tire to close the opening between the tire and the entrance to the tubular collecting guard, substantially as and for the purpose described.

2. A dust collector for motor vehicles consisting of a tubular collecting guard adapted to partly surround the wheel and having at one end thereof a bell mouth consisting of a rear wall and side cheeks, said cheeks being arranged to extend over the rear sides of the wheel, a hinged door in the lower end of the rear wall, said door having forwardly extending side portions for closing the space between the door and said side cheeks when the door is open and yielding means normally holding said door in its closed position.

In testimony whereof I have signed my name to this specification in the presence of two subscribing witnesses.

THOMAS HUNT.

Witnesses:
E. N. LEWIS,
GEORGE LESTER.

---

Copies of this patent may be obtained for five cents each, by addressing the "Commissioner of Patents, Washington, D. C."